United States Patent [19]

Maeda et al.

[11] 4,404,329
[45] Sep. 13, 1983

[54] RUBBER COMPOSITION CAPABLE OF GIVING VULCANIZATES HAVING IMPROVED OZONE CRACKING RESISTANCE AND OIL RESISTANCE

[75] Inventors: Akio Maeda; Kinro Hashimoto; Shigelu Yagishita, all of Yokohama; Masaaki Inagami, Kamakura; Hiroshi Fukushima, Zushi, all of Japan

[73] Assignee: Nippon Zeon Co., Ltd., Tokyo, Japan

[21] Appl. No.: 158,249

[22] Filed: Jun. 10, 1980

Related U.S. Application Data

[63] Continuation of Ser. No. 26,358, Apr. 2, 1979, abandoned.

[30] Foreign Application Priority Data

Apr. 6, 1978 [JP] Japan .................. 53-5339744

[51] Int. Cl.³ .................. C08C 19/22; C08C 19/20
[52] U.S. Cl. .................. 525/329.2; 525/349; 525/352
[58] Field of Search .................. 525/343, 348, 349, 352, 525/336, 329.2

[56] References Cited

U.S. PATENT DOCUMENTS

| 2,046,257 | 6/1936 | Flint | 260/768 |
|---|---|---|---|
| 2,678,892 | 5/1954 | Harvey | 260/768.1 |
| 2,836,963 | 6/1958 | Fox | 525/338 |
| 2,864,809 | 12/1958 | Jones | 525/338 |
| 3,700,637 | 10/1972 | Finch, Jr. | 525/338 |
| 3,868,354 | 2/1975 | Halasa | 525/338 |
| 3,899,474 | 8/1975 | Goldenberg | 525/338 |

FOREIGN PATENT DOCUMENTS

| 45-39275 | of 1970 | Japan | 525/338 |
|---|---|---|---|
| 50-71681 | of 1975 | Japan | 525/338 |
| 52-32095 | of 1977 | Japan | 525/338 |
| 1198195 | 7/1970 | United Kingdom | 525/338 |

OTHER PUBLICATIONS

Dunn, J. R. et al., NBR Vulcanizates Resistant to High Temp. and Sour Gasoline, Rubber Chem. Tech., 52 (No. 2), 1979 pp. 331-354.
Encyclopedia of Polymer Science and Technology, Interscience, vol. 7 (1967), pp. 563, 566.

*Primary Examiner*—C. A. Henderson
*Attorney, Agent, or Firm*—Sherman & Shalloway

[57] ABSTRACT

A rubber composition comprising (1) a partially hydrogenated copolymer rubber composed of 10 to 50% by weight of an acrylonitrile unit, 25 to 88% by weight of a hydrogenated conjugated diene unit and 2 to 25% by weight of a conjugated diene unit, and (2) a sulfur vulcanizer system. The composition can give vulcanizates having improved ozone cracking resistance and oil resistance.

4 Claims, 1 Drawing Figure

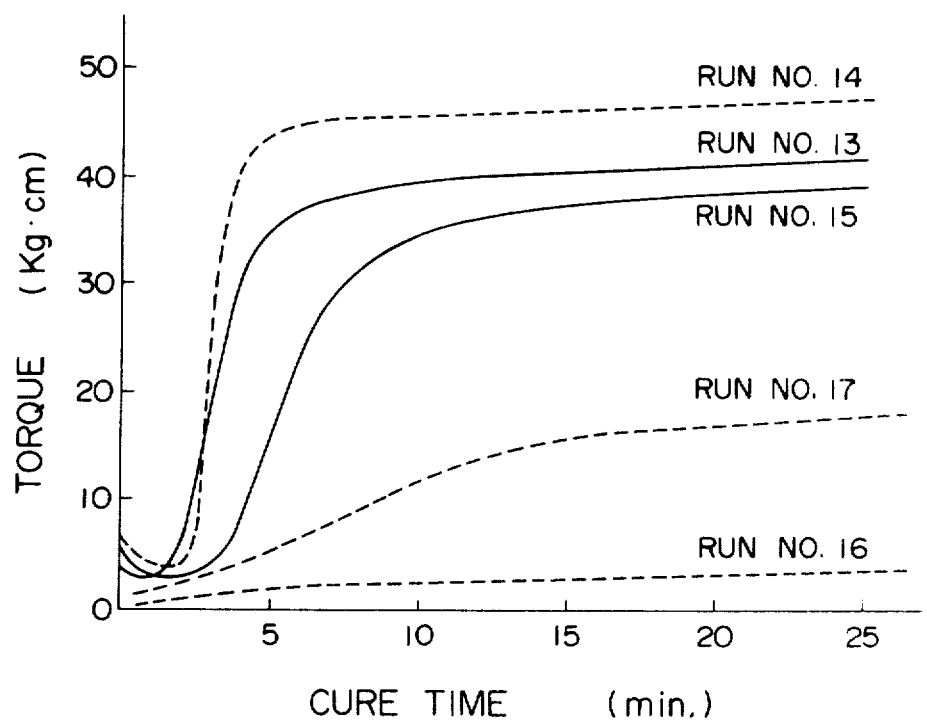

RUBBER COMPOSITION CAPABLE OF GIVING VULCANIZATES HAVING IMPROVED OZONE CRACKING RESISTANCE AND OIL RESISTANCE

This is a continuation of Application Ser. No. 026,358, filed Apr. 2, 1979, now abandoned.

BACKGROUND OF THE INVENTION

1. Field of the Invention

This invention relates to a rubber composition which gives vulcanizates having improved ozone cracking resistance and oil resistance. More specifically, the invention pertains to a rubber composition which comprises a partially hydrogenated acrylonitrile-conjugated diene copolymer rubber and a sulfur vulcanizer system, and which gives vulcanizates having improved weatherability, ozone resistance and sour gasoline resistance.

2. Discussion of the Prior Art

The recent social demand for preserving a good environment has resulted in enforcement of regulations for control of motor vehicle exhausts, and new and improved engine designs have been developed to meet these regulations. To cope with the new development in engines, many important maintenance parts of automobiles are made of synthetic rubbers having all of heat resistance, gasoline (oil) resistance, low temperature resistance and weatherability.

Among existing synthetic rubbers, an acrylonitrile-butadiene copolymer rubber (to be referred to as NBR hereinbelow) has found by far the widest application as hoses, gaskets, O-rings and oil seals because of its well-balanced combination of various properties. However, because of its unsatisfactory weatherability, NBR is frequently used protected with a cover material such as chloroprene rubber or chlorosulfonated polyethylene in such an application as hoses, and is rarely used alone.

As a result of the new and improved engine designs, the ambient atmosphere of the engine tends to attain a higher temperature than in conventional designs, and this causes heat deterioration of gasoline to form degraded gasoline known in the art as "sour gasoline."

NBR has superior gasoline resistance, but on contact with sour gasoline, will undergo degradation involving hardening. Hence, automobile parts made of NBR involve a danger of performance failure within a relatively short period of service.

Blending with a vinyl chloride resin, an ethylene/propylene copolymer rubber, etc. is one possible way of improving the weatherability of NBR. Certainly, this method brings about an improvement in weatherability, but is not practical because the blending of the vinyl chloride resin causes poor low temperature resistance and the mixing of the ethylene/propylene copolymer results in poor oil resistance.

SUMMARY OF THE INVENTION

It is an object of this invention therefore to provide a vulcanizate of an NBS-base composition having improved weatherability and ozone resistance and superior resistance to degradation with hardening by sour gasoline without sacrificing the heat resistance, gasoline (oil) resistance and low temperature resistance of NBR, and also to provide a vulcanizable rubber composition capable of giving such a vulcanizate.

We have now found that a composition comprising a partially hydrogenated copolymer rubber of acrylonitrile and a conjugated diene and a sulfur vulcanizer system meets the object of this invention.

Thus, according to this invention, there is provided a vulcanizable rubber composition comprising (1) a partially hydrogenated copolymer rubber composed of 10 to 50% by weight, preferably 25 to 45% by weight, of an acrylonitrile unit, 25 to 88% by weight, preferably 35 to 70% by weight, of a hydrogenated conjugated diene unit, and 2 to 25% by weight, preferably 5 to 20% by weight, of a non-hydrogenated conjugated diene unit, and (2) a sulfur vulcanizer system.

Surprisingly, a vulcanizate from the rubber composition of this invention has better low temperature resistance than a vulcanizate from the acrylonitrile/conjugated diene copolymer rubber composition.

BRIEF DESCRIPTION OF THE DRAWING

The invention will now be further described by the following detailed description and representative examples and the accompanying FIGURE which shows the results of the vulcanization behavior of the rubber compositions of Example 4, described hereinafter.

DETAILED DESCRIPTION OF THE INVENTION

The copolymer rubber (1) used in this invention is obtained by copolymerizing acrylonitrile with at least one conjugated diene monomer such as butadiene, isoprene or 1,3-pentadiene, and subjecting the copolymer to a hydrogenation step to hydrogenate partially the double bonds in the rubber. The partial hydrogenation of the acrylonitrile/conjugated diene copolymer rubber is carried out by an ordinary method (Japanese Patent Publication No. 39275/70 and Japanese Laid-Open Patent Publication No. 71681/75). For example, it can be achieved by dissolving the acrylonitrile/conjugated diene copolymer rubber in a suitable solvent, and passing hydrogen through the solution in the presence of a catalyst. The hydrogenation should of course be carried out under such conditions that the nitrile group in the rubber remains unchanged. The hydrogenation reaction may occur at any of the three types of double bonds in the acrylonitrile/conjugated diene copolymer rubber, i.e. the cis-bond, trans-bond and side-chain bond (e.g., 1,2-bond, 3,4-bond). Since the side-chain bond is more susceptible to hydrogenation than the other double bonds, hydrogenation to a great extent may sometimes afford a partially hydrogenated acrylonitrile/conjugated diene copolymer which is free from a double bond of the side-chain bond type.

The effect of improvement in accordance with this invention is greater with copolymer rubbers (1) having a higher ratio of hydrogenation. However, since the resulting rubber composition must be vulcanized, the non-hydrogenated conjugated diene unit should remain in an amount of at least 2% by weight. If the amount of the non-hydrogenated conjugated diene unit is more than 25% by weight, the effect of improvement intended by this invention is small.

The vulcanizate which meets the object of this invention can be obtained by vulcanizing a composition composed of (1) the partially hydrogenated acrylonitrile/conjugated diene copolymer and (2) the sulfur vulcanizer system. While a non-hydrogenated acrylonitrile/conjugated diene copolymer can be cured with a peroxide without using a sulfur-containing vulcanizer system, it is difficult, or virtually impossible, to vulcanize the partially hydrogenated copolymer rubber (1) of this invention with peroxides.

The sulfur vulcanizer system (2) used in this invention may be any of sulfur-containing vulcanizers, i.e. sulfur or sulfur-donors, normally used for NBR in amounts normally employed. Specific examples are morpholine compounds, thiuram compounds and polymeric polysulfides, such as morpholine disulfide and tetramethylthiuram disulfide. The vulcanizer (1) is used normally in an amount of 0.1 to 5 parts by weight per 100 parts by weight of the partially hydrogenated copolymer rubber (1).

The curable rubber composition of this invention may optionally contain conventional rubber compounding agents such as vulcanization accelerators, vulcanization activators, reinforcing agents, fillers, plasticizers and antioxidants, or rubbers such as NBR, in addition to the partially hydrogenated acrylonitrile/conjugated diene copolymer rubber (1) and the sulfur vulcanizer system (2). The curable rubber composition of this invention can be formed by mixing these ingredients in a conventional mixer such as a roll mill or a Banbury mixer.

Heating the vulcanizable rubber composition of this invention gives a vulcanizate having superior weatherability, ozone resistance and sour gasoline resistance. The utility of the composition of this invention is not particularly limited. However, since the vulcanizate has the aforesaid characteristics, it exhibits a marked effect when used as a material for rubber tubes or hoses which are to be used in the vicinity of engines.

The following examples illustrate the present invention more specifically.

The accompanying drawing is a graph showing the cure curves of the rubber compositions obtained in Example 4.

EXAMPLE 1

An acrylonitrile/butadiene copolymer rubber (to be referred to as NBR) containing 35% by weight of an acrylonitrile unit was dissolved in methyl isobutyl ketone, and hydrogenated in the presence of a palladium-on-carbon (Pd 5%) catalyst to form a partially hydrogenated copolymer rubber. The copolymer rubber was mixed with compounding ingredients in accordance with the following compounding recipe by means of a cold roll to form a rubber composition. A vulcanizate was produced by heating the rubber composition at 155° C. for 20 minutes under pressure.

The vulcanizate was tested in accordance with JIS K-6301 for properties in the normal state, ozone resistance, heat aging, oil resistance (a JIS No. 3 oil immersion test and a JIS reference fuel oil C immersion test), and low temperature resistance (Gehman T-10). The results are shown in Table 1.

The ozone degradation test was a so-called static ozone degradation test comprising placing a test piece under a 20% stretch in an atmosphere held at 40° C. and having an ozone concentration of 80 pphm. Evaluation of the cracked state was performed in accordance with the following standards stipulated in JIS K-6301.

| Number of cracks | Size and depth of cracks |
| --- | --- |
| A: Small | 1: Not visible with unaided eyes, but can be confirmed by a magnifying glass (10 ×) |
| B: Large | 2: Can be confirmed with unaided eyes. |

-continued

| Number of cracks | Size and depth of cracks |
| --- | --- |
| C: Innumerable | 3: The cracks are deep and relatively large (less than 1 mm) 4: The cracks are deep and large (at least 1 mm but less than 3 mm). 5: Cracks with a size of at least 3 mm, or the cracks are about to cause breaking of the sample. |

The degraded state is expressed by the indication of the number of cracks and the size and depth of the cracks in combination, as "A-4".

In the test for resistance to sour gasoline, a commercially available resular gasoline was exposed intermittently to the irradiation of ultraviolet light for 2 weeks to produde sour gasoline in accordance with the method of Operation Standards (OP-9308 (1966) of General Motors Company. The peroxide value of the resulting sour gasoline was 6.5 gram-equivalents/1000 liters when determined by the testing method (UOP Testing Method 33-59) of Universal Oil Products Company. A vulcanizate sample, 0.5 mm thick, 15 mm long and 10 mm wide, was immersed in the sour gasoline, and allowed to stand for 240 hours in an atmosphere held at 60° C., and then dried in vacuum at room temperature for one day. Then, the sample was bended through an angle of 180 degrees, and the state of cracks that occurred was observed.

| Compounding recipe | |
| --- | --- |
| Ingredients | Parts by weight |
| Copolymer rubber | 100 |
| Stearic aced | 1 |
| Zinc oxide | 5 |
| Sulfur | 0.5 |
| FEF carbon black | 40 |
| SRF carbon black | 50 |
| Dibutyl methylene bisthioglycolate (plasticizer) (*1) | 20 |
| Tetramethylthiuram disulfide (*2) | 2 |
| Cyclohexylbenzothiazyl sulfenamide (*3) | 1 |
| N—Phenyl-N—isopropyl-p-phenylenediamine (*4) | 2 |
| 2-Mercaptobenzimidazole (*5) | 1 |

(*1): Plastikator 88, a product of Bayer AG.
(*2): Noccelar TT, a product of Ouchi Shinko Chemical Co., Ltd.
(*3): Noccelar CZ, a product of Ouchi Shinko Chemical Co., Ltd.
(*4): Nocrac 810-NA, a product of Ouchi Shinko Chemical Co., Ltd.
(*5): Nocrac MB, a product of Ouchi Shinko Chemical Co., Ltd.

TABLE 1

| | Run No. | | | |
| --- | --- | --- | --- | --- |
| | Comparison | | Invention | |
| Test items | 1 | 2 | 3 | 4 |
| Constituent proportions of the partially hydrogenated copolymer rubber (wt. %) | | | | |
| Acrylonitrile unit | 33 | 33 | 33 | 33 |
| Hydrogenated butadiene unit | 0 | 22 | 47 | 52 |
| Butadiene unit | 67 | 45 | 20 | 15 |
| Properties in the normal state | | | | |
| Tensile strength (kg/cm$^2$) | 155 | 151 | 148 | 144 |
| Elongation (%) | 350 | 380 | 360 | 350 |
| Hardness (JIS) (points) | 63 | 65 | 66 | 68 |
| Ozone resistance | | | | |
| After testing for 2 hours | B-1 | B-1 | No crack | No crack |
| After testing for 24 hours | C-4 | B-4 | No crack | No crack |
| After testing for 48 hours | C-4 | B-5 | No crack | No crack |

TABLE 1-continued

| | Run No. | | | |
|---|---|---|---|---|
| | Comparison | | Invention | |
| Test items | 1 | 2 | 3 | 4 |
| Heat aging in a Geer oven | | | | |
| After 72 hours at 150° C. | | | | |
| Change in hardness (points) | +28 | +28 | +24 | +23 |
| 180° Bending test | Broken | Broken | No crack | No crack |
| Immersion in JIS No. 3 oil | | | | |
| Change in volume (%) after immersion for 166 hours at 135° C. | +6.2 | +8.6 | +11.6 | +12.9 |
| Immersion in JIS reference fuel oil C | | | | |
| Change in volume after immersion for 48 hours at 40° C. | +37.4 | +40.1 | +43.0 | +44.9 |
| Gehman T-10 (°C.) | −36 | −38 | −39 | −41 |
| Sour gasoline resistance | | | | |
| 180° Bending test | Broken | Cracks occurred | No crack | No crack |

The following conclusions can be drawn from the data shown in Table 1.

The vulcanizates of the partially hydrogenated copolymer rubber of this invention have much improved ozone cracking resistance without sacrificing the gasoline (oil) resistance, heat resistance and low temperature resistance of the vulcanizate of NBR.

When the proportion of the non-hydrogenated butadiene unit in the partially hydrogenated copolymer rubber is not more than 25% by weight, a vulcanizate having good ozone cracking resistance and being free from the loss of rubbery elasticity in a high temperature atmosphere can be obtained.

A vulcanizate of NBR (Run No. 1) was degraded with hardening in sour gasoline, and is broken in a 180° bending test. But the vulcanizates of the partially hydrogenated copolymer rubber of this invention containing not more than 25% by weight of the non-hydrogenated butadiene unit show markedly improved resistance to sour gasoline. The low temperature resistance (Gehman T-10) increases with increasing extent of hydrogenation of the partially hydrogenated copolymer rubber.

EXAMPLE 2

NBR containing 30% by weight of an acrylonitrile unit was dissolved in acetone, and hydrogenated in the presence of a palladium-on-carbon (Pd 5%) catalyst to from a partially hydrogenated copolymer rubber. Using the copolymer rubber, vulcanizates were produced in accordance with the same compounding recipe as in Example 1, and tested in the same way as in Example 1. The results are shown in Table 2.

TABLE 2

| | Run No. | | | |
|---|---|---|---|---|
| | Comparison | Invention | | |
| Test items | 5 | 6 | 7 | 8 |
| Constituent proportions of the partially hydrogenated copolymer rubber (wt. %) | | | | |
| Acrylonitrile unit | 39 | 39 | 39 | 39 |
| Hydrogenated butadiene unit | 0 | 38 | 46 | 55 |
| Butadiene unit | 61 | 23 | 15 | 6 |

TABLE 2-continued

| | Run No. | | | |
|---|---|---|---|---|
| | Comparison | Invention | | |
| Test items | 5 | 6 | 7 | 8 |
| Properties in the normal state | | | | |
| Tensile strength (kg/cm$^2$) | 161 | 147 | 134 | 155 |
| Elongation (%) | 370 | 340 | 360 | 420 |
| Hardness (JIS) (points) | 70 | 74 | 74 | 74 |
| Ozone resistance | | | | |
| After testing for 2 hours | B-1 | No crack | No crack | No crack |
| After testing for 24 hours | C-4 | No crack | No crack | No crack |
| Heat aging in a Geer oven | | | | |
| After 168 hours at 135° C. | | | | |
| Change in hardness (points) | +19 | +16 | +16 | +14 |
| Immersion in JIS reference fuel oil C | | | | |
| Change in volume after immersion for 48 hours at 40° C. | +21.0 | +25.0 | +24.8 | +27.0 |
| Gehman T-10 (°C.) | −30 | −35 | −36 | −37 |
| Sour gasoline resistance | | | | |
| 180° Bending test | Broken | No crack | No crack | No crack |

The following conclusions can be drawn from the data shown in Table 2.

The vulcanizates from the partially hydrogenated copolymer rubber of this invention have much improved ozone cracking resistance and sour gasoline resistance without sacrificing the gasoline (oil) resistance, heat resistance and low temperature resistance of the vulcanizate of NBR.

Same as in Example 1, the low temperature resistance (Gehman, T-10) increases with increasing extent of hydrogenation.

EXAMPLE 3

Using the vulcanizates obtained in Example 2, the following tests were conducted.

Since NBR is required to have heat resistance and gasoline resistance simultaneously, the heat stability was evaluated by dipping the vulcanizate in JIS reference fuel oil C at 40° C. for 48 hours, drying it in vacuum at room temperature for one day, and then heat aging it in a Geer oven at 135° C. for 72 hours.

In the static ozone resistance test, the vulcanizate was dipped in JIS reference fuel oil C at 40° C. for 48 hours, dried in vacuum at room temperature for one day, and heat-aged in a Geer oven at 100° C. for 72 hours. Then, the treated vulcanizate was stretched 20% in an atmosphere kept at 40° C. and having an ozone concentration of 80 pphm, and the static ozone resistance was measured in accordance with JIS K-6301.

The sour gasoline resistance test was performed using sour gasoline prepared in Example 1. A vulcanizate sample, 0.5 mm thick, 15 mm long and 10 mm wide, was dipped in JIS reference fuel oil C at 40° C. for 48 hours, dried in vacuum at room temperature for one day, and then dipped in the sour gasoline. It was then allowed to stand in an atmosphere kept at 60° C. for 240 hours, and dried in vacuum for one day. Then, the sample was bended through 180 degrees, and the state of occurrence of cracks was observed.

The resuls are shown in Table 3.

TABLE 3

| Test items | Run No. Comparison 9 | Run No. Invention 10 | Run No. Invention 11 | Run No. Invention 12 |
|---|---|---|---|---|
| Composition of the partially hydrogenated copolymer rubber (wt. %) | | | | |
| Acrylonitrile unit | 39 | 39 | 39 | 39 |
| Hydrogenated butadiene unit | 0 | 38 | 46 | 55 |
| Butadiene unit | 61 | 23 | 15 | 6 |
| Heat aging in a Geer oven after immersion in JIS reference fuel oil C | | | | |
| Changes in hardness (points) after 72 hours at 100° C. | +21 | +18 | +18 | +18 |
| Static ozone resistance test after immersion in JIS reference fuel oil C and heat aging in a Geer oven | | | | |
| After testing for 4 hours | C-3 | A-2 | A-1 | No crack |
| Sour gasoline resistance test | | | | |
| 180° Bending test | Broken | No crack | No crack | No crack |

It is seen from the data shown in Table 3 that the vulcanizates from the partially hydrogenated copolymer rubber of this invention retained their good heat resistance, ozone cracking resistance and sour gasoline resistance even after they were immersed in the fuel oil.

EXAMPLE 4

A partially hydrogenated copolymer rubber composed of 39% by weight of an acrylonitrile unit, 44% by weight of a hydrogenated butadiene unit and 17% by weight of a butadiene unit was prepared by partially hydrolyzing NBR containing 39% by weight of an acrylonitrile unit in accordance with the same recipe as in Example 2.

The copolymer rubber was mixed with compounding ingredients in accordance with the compounding recipes (the amounts indicated are parts by weight) shown in Table 4 by means of a cold roll. The vulcanization behaviors of the resulting rubber compositions at 155° C. were measured by an oscillating disc rheometer (a product of Toyo Seiki Kabushiki Kaisha). The results are shown in the accompanying drawing.

Vulcanizates were produced by heating the rubber compositions at 155° C. under pressure for the periods indicated in Table 4, and the properties of the resulting vulcanizates in a normal condition were measured.

The results are shown in Table 5.

TABLE 4

| | Invention 13 | Comparison 14 | Invention 15 | Comparison 16 | Comparison 17 |
|---|---|---|---|---|---|
| Partially hydrogenated copolymer rubber | 100 | — | 100 | 100 | — |
| Commercially available nitrile rubber (*6) | — | 100 | — | — | 100 |
| Stearic acid | 1 | 1 | 1 | 1 | 1 |
| Zinc oxide | 5 | 5 | 5 | 5 | 5 |
| Sulfur | 0.5 | 0.5 | — | — | — |
| FEF carbon black | 40 | 40 | 40 | 40 | 40 |
| SRF carbon black | 50 | 50 | 50 | 50 | 50 |
| Dibutyl methylene bis-thioglycolate (plasticizer) | 20 | 20 | 20 | 20 | 20 |
| Tetramethylthiuram disulfide | 2 | 2 | 1.5 | — | — |
| Cyclohexylbenzothiazyl sulfenamide | 1 | 1 | — | — | — |
| Dicumyl peroxide (*7) | — | — | — | 5 | 5 |
| Morpholine disulfide (*8) | — | — | 1.5 | — | — |
| N—phenyl-N—isopropyl-p-phenylenediamine | 2 | 2 | 2 | 2 | 2 |
| 2-Mercaptobenzimidazole | 1 | 1 | 1 | 1 | 1 |

(*6): Nipol 1041 (combined acrylonitrile content 41%; a product of Nippon Zeon Co., Ltd.)
(*7): Di-cup 40C (a product of Hercules Company)
(*8): Vulnoc R (a product of Ouchi Shinko Chemical Co., Ltd.)

TABLE 5

| Test items | Invention 13 | Comparison 14 | Invention 15 | Comparison 16 | Comparison 17 |
|---|---|---|---|---|---|
| Vulcanization time (minutes) | 20 | 20 | 20 | 40 | 40 |
| Tensile strength (kg/cm$^2$) | 131 | 149 | 126 | 38 | 130 |
| Elongation (%) | 300 | 330 | 350 | 840 | 470 |
| Hardness (JIS) (points) | 73 | 69 | 73 | 59 | 57 |

It is seen from the data shown in Table 5 that the vulcanizates of this invention formed by using a sulfur-containing vulcanizer show a good vulcanization speed comparable to the case of vulcanizing non-hydrogenated NBR with a sulfur-containing vulcanizer system (Run No. 14), whereas in the comparison runs in which the vulcanization is performed using peroxides, the rate of vulcanization is slow, and the vulcanizates obtained do not have good performance. Thus, it is clear that vulcanization of the partially hydrogenated copolymer rubber of this invention requires the use of a sulfur vulcanizer system.

What we claim is:

1. A method of preventing deterioration of vulcanizable rubber products which come into contact with sour gasoline which comprises forming said product from a sulfur-vulcanized rubber article comprising a sulfur-vulcanized, filled partially hydrogenated random copolymer composed of 10 to 50% by weight of an acrylonitrile unit, 25 to 88% by weight of a hydrogenated conjugated diene unit and 2 to 25% by weight of a conjugated diene unit, and allowing said sulfur-vulcanized rubber article to come into contact with sour gasoline.

2. The method of claim 1 in which the copolymer is composed of 25 to 45% by weight of acrylonitrile unit, 35 to 70% by weight of a hydrogenated conjugated diene unit and 5 to 20% by weight of a conjugated diene unit.

3. The method of claim 1 wherein the conjugated diene is at least one member selected from a group consisting of butadiene, isoprene and 1,3-pentadiene.

4. A rubber product such as hose or tube in combination with an internal combustion engine which generates sour gasoline from gasoline, said rubber product coming into contact with the sour gasoline and being formed from a sulfur-vulcanized, filled partially hydrogenated random copolymer composed of 10 to 50% by weight of an acrylonitrile unit, 25 to 88% by weight of a hydrogenated conjugated diene unit and 2 to 25% by weight of a conjugated diene unit.

* * * * *

UNITED STATES PATENT AND TRADEMARK OFFICE
CERTIFICATE OF CORRECTION

PATENT NO. : 4,404,329
DATED : September 13, 1983
INVENTOR(S) : Akio Maeda; Kinro Hashimoto; Shigelu Yagishita;
Masaaki Inagami; Hiroshi Fukashima It is certified that error appears in the above—identified patent and that said Letters Patent is hereby corrected as shown below:

The Foreign Application Priority Data should be changed from "53-5339744" to ---53-39744---

Signed and Sealed this

Twentieth Day of December 1983

[SEAL]

Attest:

Attesting Officer

GERALD J. MOSSINGHOFF

Commissioner of Patents and Trademarks